United States Patent [19]
Lemoine et al.

[11] Patent Number: 5,346,760
[45] Date of Patent: Sep. 13, 1994

[54] COMPOSITE MATERIAL BASED ON RUBBERS OF THE SILICONE TYPE AND OF THE ETHYLENE-PROPYLENE COPOLYMER OR TERPOLYMER TYPE

[75] Inventors: Guy Lemoine; Etienne Benard, both of Le Havre; Christian Exandier, Le Fontenay, all of France

[73] Assignee: Total Ruffinage Distribution S.A., Levallois Perret, France

[21] Appl. No.: 824,326

[22] Filed: Jan. 23, 1992

[51] Int. Cl.$^5$ .................. B32B 5/16; B32B 25/08; B32B 25/16; B32B 25/20
[52] U.S. Cl. .................... 428/331; 428/328; 428/329; 428/330; 428/332; 428/334; 428/447; 428/451; 428/516; 428/517; 428/519
[58] Field of Search ............... 428/328, 329, 331, 332, 428/447, 451, 330, 334, 517, 521, 516, 519

[56] References Cited

U.S. PATENT DOCUMENTS

| | | | |
|---|---|---|---|
| 3,398,043 | 8/1968 | Youngs | 428/447 X |
| 4,714,733 | 12/1987 | Itoh et al. | 524/493 |
| 4,808,643 | 2/1989 | Lemoine et al. | 524/87 |

FOREIGN PATENT DOCUMENTS

| | | |
|---|---|---|
| 0286551 | 10/1988 | European Pat. Off. . |
| 314396 | 10/1988 | European Pat. Off. . |
| 0310724 | 5/1992 | European Pat. Off. . |
| 1489261 | 7/1967 | France . |
| 2597028 | 10/1987 | France . |
| 56-116739 | 9/1981 | Japan . |
| WO86/02088 | 9/1985 | PCT Int'l Appl. . |

*Primary Examiner*—D. S. Nakarani
*Attorney, Agent, or Firm*—A. Thomas S. Safford

[57] ABSTRACT

A composite material comprising at least two elastomer layers, the first layer having a first composition comprising from 40 to 80 percent by weight of silicone rubber, the second layer having a second composition comprising from 50 to 100 percent by weight of rubber of the ethylene-propylene copolymer and/or terpolymer type, wherein the first composition further contains from 20 to 60 percent by weight of rubber of the ethylene-propylene copolymer and/or terpolymer type, and each of the two compositions contains more than 5 percent, and preferably from 5 to 60 percent, by weight of silica.

16 Claims, No Drawings

COMPOSITE MATERIAL BASED ON RUBBERS OF THE SILICONE TYPE AND OF THE ETHYLENE-PROPYLENE COPOLYMER OR TERPOLYMER TYPE

BACKGROUND OF THE INVENTION

The present invention relates to a composite material comprising at least two layers of elastomers, one layer containing a silicone-type rubber, and the other layer an ethylene-propylene copolymer and/or terpolymer rubber. The invention further relates to manufacturing processes for this composite.

FIELD OF THE INVENTION

Elastomers of the silicone type have found many uses over the last few years because of certain of their physical properties, such as their good heat resistance, their good surface appearance, their anti-adhesive character and their stability in the presence of colorants.

However, silicone-type elastomers are still rather expensive in comparison with elastomers such as the ethylene-propylene copolymer and/or terpolymer, which, moreover, have mechanical properties and a resistance to certain chemical agents such as to oils and motor fuels which are superior to those of silicone rubbers.

A first technique has been proposed with a view to rendering these two elastomer types compatible in a single rubber formulation. (In this connection, see Japanese patent 56 116 739 and European patent 286,551.)

However, in order that the hybrid material so obtained have characteristics similar to those of silicone-type elastomers, it is necessary to incorporate in it a significant quantity (at least 40 percent by weight) of silicone-type rubber and, further, to render the two elastomers compatible, for example, by grafting, which adds substantially to the manufacturing costs. Moreover, it has long been attempted to make composite materials which combine in one and the same material distinct layers having the qualities inherent in each of these elastomers. However, up to now it has not been possible to vulcanize a layer of a silicone-type elastomer conjointly with a layer of ethylene-propylene copolymeric and/or terpolymeric rubber. In fact, as taught in French patent 2,597,028, not only will diffusion phenomena lead to the deterioration of the mechanical properties of each of the layers of the composite but these layers are insufficiently bonded to each other so that the risks of delamination limit the uses of this type of composite material to only a few applications, such as the fabrication of pipes, tubes and coaxial sheaths.

To overcome these drawbacks, it has been proposed to intercalate between the layers of the different elastomers, an adhesive mixture (see French patent 1,489,261) or a coupling medium (see French patent 2,597,028, cited earlier) capable of serving as a protective barrier between the two elastomer layers. However, problems which arise due to the cost and the mechanical strength of the coupling medium and of the composite, limit the industrial development of such composite materials.

SUMMARY OF THE INVENTION

The present invention provides a novel composite material comprising at least two elastomer layers, one containing primarily a silicone-type rubber and the other containing a rubber of the ethylene-propylene copolymer and/or terpolymer type, which composite does not require an intermediate protective material and which layers are nevertheless sufficiently bonded to each other to prevent any subsequent delamination.

Applicants have, in fact, discovered that this advantageous result can be surprisingly obtained by incorporating in each of the two layers of the composite a certain quantity of a silica which silica has an appropriate specific surface and particle size.

It is known that in order to render elastomers suitable for a given use, it is advisable to incorporate in them in the course of their fabrication a certain number of vulcanizing agents, plasticizers, processing aids, additives, and especially reinforcing fillers.

The most widely used reinforcing fillers are, in particular, the carbon blacks in the case of ethylene-propylene copolymers and/or terpolymers, and the silicas in the case of silicone-based rubbers.

In the course of working with the fabrication and vulcanization of composite materials comprising at least two layers of different elastomers, Applicants have found that, contrary to the teaching of the prior art, the two rubber layers can easily be covulcanized in a single operation while preserving the desirable physical properties of each layer and imparting to them perfect adhesion properties, provided that each of the two layers contains at least:

Ethylene-propylene copolymer and/or terpolymer rubber in a substantial quantity, meaning that the elastomer layer of the silicone type contains from 20 to 60 percent by weight of ethylene-propylene copolymer and/or terpolymer rubber.

A silica, preferably of a given porosity, in a quantity exceeding 5 percent, and preferably ranging from 5 to 60 percent, by weight of the rubber, in each of the two elastomer layers, meaning that the layer of ethylene-propylene copolymer and/or terpolymer contains preferably from 10 to 15 percent by weight of silica.

DESCRIPTION OF THE PREFERRED EMBODIMENT

The present invention thus has as a preferred embodiment a composite material comprising at least two elastomer layers, the first layer having a first composition which composition comprises from 40 to 80 percent by weight of silicone rubber while the second layer has a second composition which composition comprises from 50 to 100 percent by weight of rubber of the ethylene-propylene copolymer and/or terpolymer type. The composite material is further characterized in that the first composition also contains from 20 to 60 percent by weight of rubber of the ethylene-propylene copolymer and/or terpolymer type, and each of the two compositions contains more than 5 percent, and preferably from 5 to 60 percent, by weight of silica.

While the patentability of the instant invention is not bound to this concept and while explanation may not be the only one which explains the improvement of the adhesion between the individual elastomer layers, it is believed that the silica particles close to the interface of the two layers develop the cohesion between the elastomers of each of these layers and, during vulcanization, fix the elastomers of the ethylene-propylene copolymer and/or terpolymer type of each layer both mechanically and chemically. It appears, in fact, that through the selection of a certain size, the structure of the particles and the chemistry of the surfaces, the silicas may provide for the creation of a network and contribute to the formation of more or less strong linkages between polymers, which may be reinforced by the presence of various carefully selected coupling agents.

To this end, the silicas used in the two elastomer layers in accordance with the present invention are preferably so-called pyrogenic or precipitated silicas having a pore volume (macroporosity) of from 150 to 250 m$^3$/g, as determined by the CTAB (cetyltrimethylammonium bromide) method.

Moreover, these silicas may advantageously have a specific surface of from 175 to 225 m$^2$/g, as measured by the BET method.

In addition to the significant improvement in the adhesive power of the two elastomer layers relative to each other, a second advantage inherent in the choice of the silica stems from its particle size. A silica of small particle size allows for very good dispersion to be obtained at a low concentration. Furthermore, the increase in the viscosity of the resins due to the introduction of such silicas is largely offset by the plasticizing and dispersing effect of the polysiloxane gum introduced into the silicone-type layer. This makes it possible to significantly limit the quantity of oil in the formulation, which greatly minimizes the possibility of migration of one layer into the other before the vulcanizing stage. The physical properties of the final composite, such as its lightfastness, its surface appearance, and the ease with which it can be applied as a very fine film, are significantly improved.

The quantity of oil present in the silicone-rubber layer can thus be limited to less than 10 percent by weight, and the use of oil can preferably even be dispensed with through proper choice of a silica having, for example, an average primary-particle size of less than 12 nanometers (nm), and of a polysiloxane gum.

In accordance with the invention, the layer of silicone-type elastomer has, for example, a composition as follows (expressed in parts by weight):

($A_1$) From 40 to 80 parts of a diorganopolysiloxane gum of the general formula $R_{3-a}(R'O)_aSiO(R_2SiO)_nSi(OR')_aR_{3-a}$, where the symbols R, alike or different, represent $C_1$-$C_8$ hydrocarbon radicals, substituted or unsubstituted by halogen atoms, or cyano radicals; the symbol R' represents a hydrogen atom or a $C_1$-$C_4$ alkyl radical; the symbol a represents 0 or 1; and the symbol n represents a number having a sufficient value to obtain a viscosity of at least 1 million mPa's at 25° C., at least 50 percent by number of the radicals represented by R being methyl radicals, and from 0.005 to 0.5 mole percent of the units entering into the composition of the gum being selected from among those of the formulas $(CH_2=CH)$ $(R)SiO$ and $(CH_2=CH)R_{2-a}(R'O)_aSi_{0.5}$;

($B_1$) from 60 to 20 parts of an ethylene-propylene copolymer and/or terpolymer gum comprising from 40 to 80 percent by weight of ethylene, from 60 to 20 percent by weight of propylene, and from 1 to 10 percent by weight of a conjugated monomeric diene, or a mixture of these two polymers, and especially an elastomer such as EPDM (ethylene-propylene diene monomer);

($C_1$) from 5 to 60 parts of a silica selected preferably from among the pyrogenic or precipitated silicas;

($D_1$) from 5 to 80 parts of other, nonreinforcing fillers;

($E_1$) from 0 to 5 parts of compounds having antioxidant action;

($F_1$) less than 10 parts, and preferably less than 1 part, of an organic or petroleum-base oil of a type known per se;

($G_1$) from 2 to 10 parts of a crosslinking agent of a type known per se; and ($H_1$) from 0 to 25 parts of crosslinking coagents.

As component ($A_1$), a single diorganopolysiloxane of the type defined above or a mixture of such compounds may be used.

Component ($B_1$) is well known in the art and is commercially available in the unvulcanized state. The EPDM may be used alone or in a mixture. Generally, component ($B_1$) contains various known additives, such as reinforcing fillers or extenders, plasticizers, pigments and flame retardants. However, the quantities of component ($B_1$) to which reference is made in this specification apply only to the polymers and do not include additives.

The silicas ($C_1$) may be incorporated as is or after treatment with organosilicic compounds customarily used for this purpose. These compounds include the methylpolysiloxanes, such as hexamethyldisiloxane or octamethylcyclotetrasiloxane, methylpolysilazanes such as hexamethyldisilazane or hexamethylcyclotrisilazane, chlorosilanes such as dimethyldichlorosilane, trimethylchlorosilane, methylvinyldichlorosilane or dimethylvinylchlorosilane, alkoxysilanes such as dimethyldimethoxysilane, dimethylvinylethoxysilane or trimethylmethoxysilane. During this treatment, the silicas may undergo a weight increase of up to about 18 to 20 percent of their starting weight. These silicas preferably have a specific surface, a macroporosity and a particle size as described earlier.

The fillers ($D_1$) consist of mineral fillers whose average particle diameter is greater than 100 nm. They include, in particular, ground quartz, calcined clays, and calcium carbonate, colorants such as the zinc, iron, titanium, cobalt, magnesium and aluminum oxides, or inorganic or organic pigmentary colorants (such as phthalocyanine, for example), carbon black, the magnesium and aluminum silicates, the aluminum, calcium and barium sulfates, asbestos, glass and carbon fibers as well as synthetic fibers such as aramid, polyester, polyamide and rayon.

As compounds ($E_1$), phenol derivatives, in particular, may be used.

The petroleum-base oil ($F_1$) will be an optionally hydrogenated paraffinic or naphthenic oil, or also a polyacid ester or another acid or anhydride derivative.

The crosslinking agent ($G_1$) is, in particular, an organic peroxide such as bis 2,4-dichlorobenzoyl peroxide, dicumyl peroxide, 2,5-dimethyl-2,5-bis (tributylperoxy) hexane, or bis (tert-butyl peroxy isopropyl) benzene. However, crosslinking may also be brought about by radiation or by grafting of silanes which crosslink in moisture.

The crosslinking coagents ($H_1$) are polybutadienes or polymethacrylates, for example, used alone, as a mixture, or modified.

The layer of the composite based on an ethylenepropylene copolymer or terpolymer preferably has the following composition:

($A_2$) from 50 to 100 parts of a rubber gum;

($B_2$) from 0 to 50 parts of a rubber different from rubber ($A_2$);

($C_2$) from 5 to 60 parts of a silica;

($D_2$) from 10 to 200 parts of another filler, whether reinforcing or not;

($E_2$) from 0 to 5 parts of at least one antioxidant compound;

($F_2$) from 0 to 150 parts of a petroleum-based or organic oil;

($G_2$) from 1 to 10 parts of a crosslinking agent; and ($H_2$) from 0 to 10 parts of products adapted to facilitate, in a known manner, the processing of the composite; and ($I_2$) from 0 to 25 parts of crosslinking coagents.

The rubber gum ($A_2$) is preferably of the same type as the gum chosen as ingredient ($B_1$) of the silicone-based composition described earlier. This gum is advantageously a rubber of the EPDM type.

The rubber ($B_2$) may be selected from among the vulcanizable elastomers, such as the nitrile rubbers, styrenebutadiene rubbers or natural rubber, the fluoroelastomers, the chlorosulfonated or chlorinated polyethylenes, the acrylic rubbers, the epichlorohydrin rubbers and, generally, all vulcanizable elastomers having properties which complement those of the rubber ($A_2$), as well as from among the thermoplastic elastomers which do not require vulcanization and the nonvulcanizable thermoplastics.

The silica ($C_2$) is preferably selected from among the pyrogenic or precipitated silicas of the same type as the silica chosen as ingredient ($C_1$) of the silicone-type elastomer layer and is preferably identical with it.

The filler ($D_2$) is preferably carbon black but may also be a filler such as ($D_1$) defined above.

The derivative ($E_2$) is a high-molecular-weight phenol derivative, for example.

The oil ($F_2$) may be of a known type, for example, a paraffinic oil, either hydrogenated or not.

Similarly, the crosslinking agent ($G_2$) may be of a known type, for example, a peroxide such as mentioned above for the agents ($G_1$) of the silicone elastomer layer, or a sulfur derivative selected for its nonmigratory character.

Component ($H_2$) is, for example, a polyethylene wax, a fatty acid derivative or a glycerol customarily used in this type of composition.

The crosslinking agent ($I_2$) may be a polybutadiene or a polymethacrylate, alone, in a mixture, or modified.

The preparation of the compositions which make up each of the two elastomer layers may be carried out in the usual manner by means of a Banbury mixer or an in-line blender. Of course, care should be taken in their preparation that the temperature during the mixing step is always below the activation temperature of the vulcanizing agent, if such agents are introduced during this step. The two compositions necessary for fabrication of each of the two layers can then be covulcanized in contact with each other through a heat treatment, preferably under pressure. The vulcanization should be performed at a temperature of from 100° to 200° C. for a period of from three minutes to three hours at a pressure ranging from 2 to 20 MPa. This may be done using salt baths, fluidized beds, hot-air treatments or ultrahigh frequency systems in a known manner.

The composite material in accordance with the invention may be prepared conventionally by molding, compression, calendering or injection of the two layers and their covulcanization in contact with each other.

This composite material may also be fabricated industrially in a particularly advantageous manner by coextrusion. In fact, the choice of the relative proportions of silicone, silica and EPDM described earlier assures the compatibility and adhesion of the two layers without the use of a third for compatibility or of another coupling system, so that the composite material can be fabricated industrially directly by coextrusion on a twin-screw extruder, followed by covulcanization.

The present invention is illustrated by the examples which follow. These are selected and included for purposes of illustrating the invention in order that others skilled in the art will more fully understand the invention and the principles thereof and will thus be enabled to modify it in a variety of forms, each as may be best suited the conditions of a particular use.

EXAMPLE 1

A number of specimens of two-layer rubbers are produced under the following conditions:

A sheet of silicone rubber is prepared from a test piece in a thin layer about 1 mm thick, selected with a view to making an outer layer having good gloss, slip, ozone resistance, lightfastness and color stability properties. In fact, it is well known that unlike their homologs based on ethylene-propylene copolymer and/or terpolymer rubbers, white silicone rubbers do not yellow.

A thick sheet (about 1 cm thick) of ethylene-propylene copolymer rubber is then prepared from a test piece based on EPDM, selected especially because of its good mechanical properties and its moderate cost.

These two sheets are then covulcanized in a press in contact with each other under the following conditions:
Duration: 4 to 5 minutes
Pressure: 50 to 100 bars
Temperature: 150° to 180° C. (depending on the nature of the peroxide)

The various formulations of the compositions making up the two layers, as well as the properties of the composite resulting from their covulcanization, are given in Table I below in order to show the relative amounts of the various components of each of the layers.

In this table, the silicone elastomer used is polysiloxane supplied by Rhone-Poulenc as SIL 11, while the ethylene-propylene copolymer and/or terpolymer elastomer is an EPDM furnished by Total Chimie under the reference EP Total 035. Moreover, the silica used is a pyrogenic silica with a macroporosity (CTAB) of 200 m$^2$/g, a specific surface of 200 m$^2$/g and a particle size of 12 nm. This silica is marketed by Degussa as Aerosil 200.

The compositions listed in this table are given in parts by weight per 100 parties of gum (EPDM gum and/or silicone gum).

TABLE 1

| Composite | $E_1$ | $E_2$ | $E_3$ | $E_4$ | $E_5$ | $E_6$ | $E_7$ | $E_8$ | $E_9$ |
|---|---|---|---|---|---|---|---|---|---|
| Silicone rubber | | | | | | | | | |
| Silicone gum | 100 | 100 | 90 | 80 | 60 | 60 | 60 | 50 | 40 |
| EPDM gum | 0 | 0 | 10 | 20 | 40 | 40 | 40 | 50 | 60 |
| Silica* | 28 | 28 | 25 | 32 | 32 | 17 | 17 | 24 | 12 |

TABLE 1-continued

| Composite | E₁ | E₂ | E₃ | E₄ | E₅ | E₆ | E₇ | E₈ | E₉ |
|---|---|---|---|---|---|---|---|---|---|
| $TiO_2$ | 10 | 10 | 10 | 10 | 10 | 10 | 10 | 10 | 10 |
| ZnO | 10 | 10 | 10 | 10 | 10 | 10 | 10 | 10 | 10 |
| Paraffinic oil | 0 | 0 | 0 | 0 | 0 | 0 | 15 | 0 | 0 |
| Silane | 0.5 | 0.5 | 0.5 | 0.5 | 0.5 | 0.5 | 0.5 | 0.5 | 0.5 |
| Peroxide | 7 | 7 | 7 | 7 | 7 | 7 | 7 | 7 | 7 |
| EPDM rubber | | | | | | | | | |
| EPDM gum | 100 | 100 | 100 | 100 | 100 | 100 | 100 | 100 | 100 |
| Silica* | 10 | 0 | 5 | 10 | 10 | 0 | 10 | 15 | 15 |
| Carbon black | 130 | 130 | 130 | 130 | 130 | 130 | 130 | 130 | 130 |
| Paraffinic oil | 80 | 80 | 80 | 80 | 80 | 80 | 80 | 80 | 80 |
| ZnO | 5 | 5 | 5 | 5 | 5 | 5 | 5 | 5 | 5 |
| Peroxide | 7 | 7 | 7 | 7 | 7 | 7 | 7 | 7 | 7 |
| Properties of composite | | | | | | | | | |
| Appearance | ++ | ++ | ++ | ++ | ++ | ++ | ++ | ++ | + |
| Adhesion | − | − | − | + | ++ | − | − | ++ | − |
| Peel strength (daN/cm) | 0 | 0 | 0.5 | >2 | >2.5 | 0 | 0.5 | >3 | 1 |

*Total quantity of silica in the elastomer layer.

It is apparent from this table that the outward appearance of the silicone-based layer is not really satisfactory unless that layer contains at least 40 percent by weight of silicone. Moreover, to obtain good adhesion, with a peel strength of greater than 1.5, and preferably greater than 2, two conditions must be satisfied. The EPDM-type rubber content should exceed 20 percent, and the silica content of the EPDM-based layer should exceed 10 percent, by weight of the rubber.

EXAMPLE 2

A number of specimens of two-layer rubber are prepared under the same conditions of covulcanization in a press, with the two layers in contact with each other, as in Example 1, from the same formulations as those of specimen E₈ given in Table 1 but by varying the grades of the silicas used. The latter were supplied by Rhone-Poulenc (Zeosil) and Degussa (Aerosil).

Table 2 which follows shows the development of the adhesion of the two layers of the composite as a function of the grade of the silica.

TABLE 2

| Composite | E₁₀ | E₁₁ | E₁₂ |
|---|---|---|---|
| Silica | Aerosil 200 | Zeosil 35 | Zeosil 175 |
| Macroporosity (m²/g) | 200 | 90 | 185 |
| Average particle size (nm) | 12 | 30 | 200* |
| Adhesion | ++ | − | + |
| (daN/cm) | >3 | 0.5 | 1.5 |

*Beads: 200 nm at the aggregate level.

It is apparent that while maintaining the macroporosity above about 150 m²/g is a determinant factor for obtaining good adhesion, the particle size also becomes important as that limit is approached (see composite E₁₂). Thus, with 200-nm silica beads, the adhesion is barely satisfactory even though the macroporosity is 185 m²/g.

EXAMPLE 3

This example is intended to illustrate the desirability of a composite material in accordance with the invention, whose silicone-based rubber layer is a very thin faced layer, which layer adheres to another layer of EPDM-type rubber selected primarily on the basis of its intrinsic physical properties and its cost.

The formulation of the two layers is the same as that of test piece E₈ of Example 1. In this example, the composite material is fabricated by coextrusion with a twin-screw extruder, and because of the excellent serviceability of the silicone-based elastomer layer being treated (the Mooney viscosity prior to coextrusion is about 40), it is indeed possible to adhere a very thin white faced layer based on silicone rubber to a black EPDM section.

The section E₁₃ so prepared is exposed for about 1,000 hours to light (xenon-arc-lamp Xenotest). In Table 3 which follows, the result of this test is compared with that obtained with two control specimens subjected to the same Xenotest. One of these, T₁, is a specimen based on silicone rubber of the same type as the face layer though not covulcanizable since it does not incorporate EPDM. The other, T₂, is a specimen of white EPDM rubber.

TABLE 3

| Composite | E₁₃ | T₁ | T₂ |
|---|---|---|---|
| Lightfastness after 1,000 hours | 8 | 8 | 2 |

It is apparent from this table (tests E₁₃ and T₁) that the face layer has the same insensitivity to the action of light as a pure silicone rubber but in addition has the compatibility and adhesion properties described above in Example 1. It is further observed that this thin faced layer provides the inventive two-layer material with a superior esthetic quality (see columns E₁₃ and T₂), since the white section based on pure EPDM yellows considerably when subjected to the same light treatment, which renders it unfit for certain industrial uses.

The instant application is based on French patent application No. 90.13531, filed Oct. 31, 1990 and upon corresponding European patent application No. 91402926.9, filed Oct. 31, 1991, the disclosure of which Applicants hereby incorporate by reference, although not claiming priority therefrom.

What is claimed is:

1. A composite material comprising at least two different elastomer layers, the first layer having a first composition of from 40 to 80 percent by weight of silicone rubber and from 20 to 60 percent by weight of ethylene-propylene copolymer and/or terpolymer rubber, the second layer having a second composition whose rubber content consists essentially of from 50 to 100 percent by weight of ethylene-propylene copolymer and/or terpolymer, and from 0 to 50 percent by weight of a rubber selected from the group consisting of nitrile rubbers, styrene-butadiene rubbers, natural rubbers, fluoroelastomers, chlorosulfonated or chlorinated polyethylenes, acrylic rubbers, epichlorohydrin rubbers, thermoplastic elastomers and nonvulcanizable thermoplastics, the first composition contains more than 10 percent by weight of silica and the second composition contains more than 10 percent by weight of silica in said compositions, and the silica has a pore volume ranging from 150 to 250 m$^3$/gram and an average primary particle size of less than 12 nanometers.

2. The composite material as defined in claim 1, wherein each of the two compositions contains from 10 to 60% by weight of silica.

3. The composite material as defined in claim 1, wherein the silica used in the two elastomer compositions is pyrogenic or precipitated silica.

4. The composite material as defined in claim 1, wherein the first silicone-based layer contains less than 10 percent by weight of the rubber, of hydrogenated oil.

5. The composite material as defined in claim 3, wherein the first silicone-based layer contains less than 10 percent by weight of the rubber, of unhydrogenated oil.

6. The composite material as defined in claim 4, wherein the first silicone-based layer contains less than 1 percent by weight of the rubber, of hydrogenated oil.

7. The composite material as defined in claim 5, wherein the first silicone-based layer contains less than 1 percent by weight of the rubber, of unhydrogenated oil.

8. The composite material as defined in claim 1, wherein the silicone rubber of the first layer is a diorganopolysiloxane.

9. The composite material as defined in claim 5, wherein the silicone rubber of the first layer is a diorganopolysiloxane.

10. The composite material as defined in claim 1, wherein the ethylene-propylene copolymer and/or terpolymer rubber contained in the first and second layers is an ethylene-propylene copolymer comprising (1) about 40 to 80 percent by weight of ethylene and 60 to 20 percent by weight of propylene, (2) from 40 to 80 percent by weight of ethylene, from 60 to 20 percent by weight of propylene, and from 1 to 10 percent by weight of a conjugated monomeric diene or (3) a mixture of the two copolymers (1) and (2).

11. The composite material as defined in claim 9, wherein the ethylene-propylene copolymer and/or terpolymer rubber contained in the first and second layers is an ethylene-propylene copolymer comprising (1) about 40 to 80 percent by weight of ethylene and 60 to 20 percent by weight of propylene, (2) from 40 to 80 percent by weight of ethylene, from 60 to 20 percent by weight of propylene, and from 1 to 10 percent by weight of a conjugated monomeric diene or(3) a mixture of the two copolymers(1) and (2).

12. The composite material as defined in claim 1, wherein the elastomer layer based on silicone contains peroxide as a vulcanizing agent.

13. The composite material as defined in claim 1, wherein the layer based on silicone rubber contains from 5 to 80 parts by weight of colorants selected from the group consisting zinc oxide, iron oxide, titanium oxide, cobalt oxide, magnesium oxide, aluminum oxide, organic pigment and any other inorganic pigment, per 100 parts by weight of said first composition.

14. The composite material as defined in claim 11, wherein the layer based on silicone rubber contains from 5 to 80 parts by weight of colorants selected from the group consisting zinc oxide, iron oxide, titanium oxide, cobalt oxide, magnesium oxide, aluminum oxide, organic pigment and any other inorganic pigment, per 100 parts by weight of said first composition.

15. The composite material as defined in claim 1, wherein the first layer based on silicone is used as a face layer of the composite material in a thickness of less than 1 mm.

16. The composite material as defined in claim 14, wherein the first layer based on silicone is used as a face layer of the composite material in a thickness of between 0.1 and 0.5 mm.

* * * * *